Jan. 13, 1948.   A. M. SIGNALNESS   2,434,335
DECOY
Filed Nov. 6, 1945
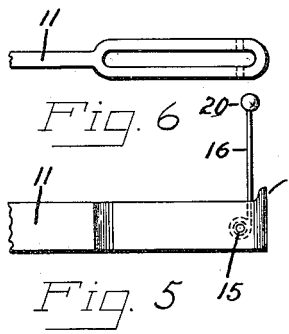
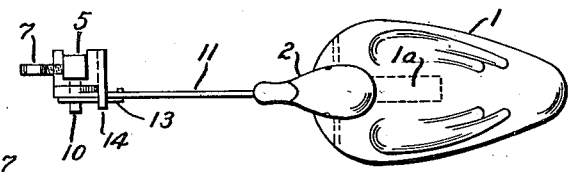
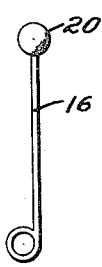
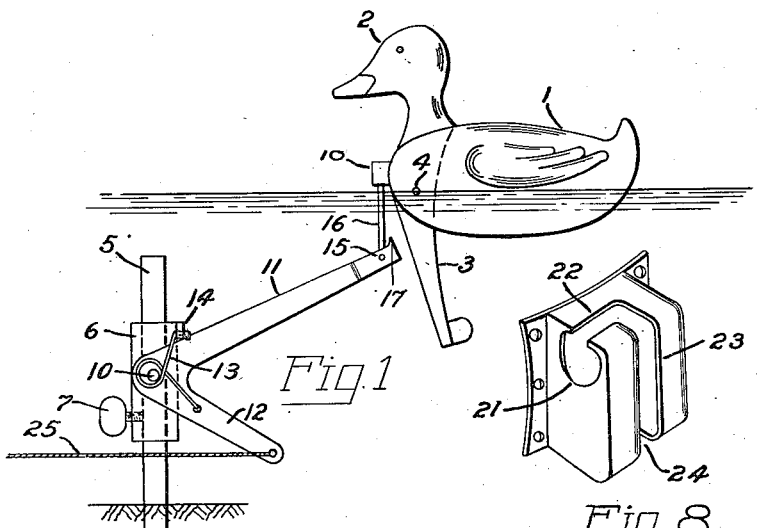
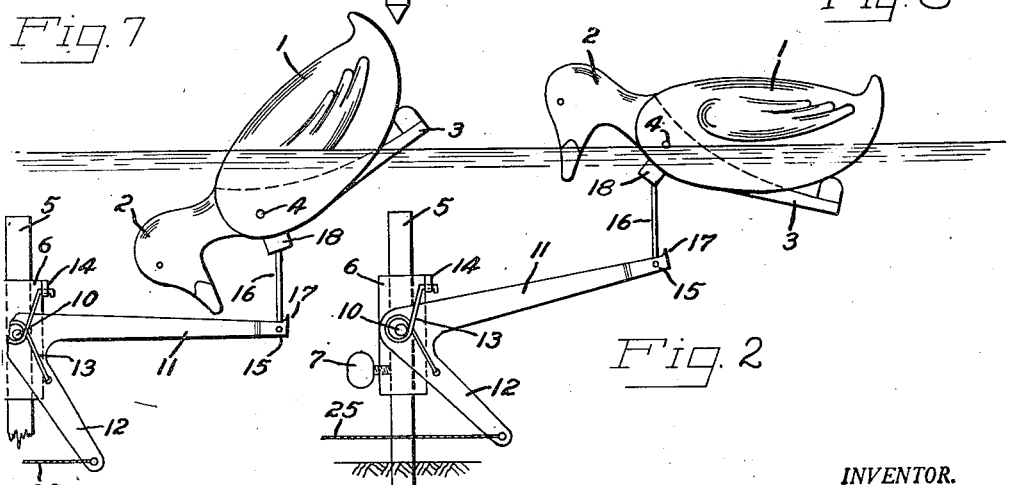
INVENTOR.
A. M. Signalness
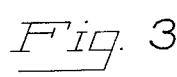
Attys.

Patented Jan. 13, 1948

2,434,335

UNITED STATES PATENT OFFICE 2,434,335

DECOY

Alfred M. Signalness, North Bend, Oreg.

Application November 6, 1945, Serial No. 626,988

9 Claims. (Cl. 43—3)

My present invention has for its object to provide a decoy for the use of hunters for attracting wild ducks or other fowl in flight to induce them to alight on the water or to fly close to a blind, thus coming within range of the hunter's fowling piece.

Another feature of my invention is an association of parts which are capable of manipulation from a point some distance from the point of anchorage of the decoy whereby the latter may be caused to simulate the act of feeding, the movement so imparted serving the better to attract fowl in flight causing them to deflect their course in the sky.

My invention also comprehends an improved means for anchoring a decoy duck irrespective of the depths of the water in the vicinity of the blind, whereby it will ride the surface of the water in a natural manner with reference to the air and water currents.

To these and other ends my invention embodies additional improvements all as will be fully described in the accompanying specification, the novel features thereof being set forth in the appended claims.

In the drawings:

Figure 1 is a view of a decoy embodying my invention riding at anchor.

Figure 2 is a similar view showing the decoy in the first position of adjustment with the head and neck depressed.

Figure 3 is a view of the second position or that of diving.

Figure 4 is a top plan view of the decoy and anchorage.

Figure 5 is a side elevation, and,

Figure 6 is an enlarged plan view of one end of the decoy operating lever.

Figure 7 is a view in elevation of the connecting rod.

Figure 8 is a detail view of the universal joint connection between the decoy and the operating rod of Fig. 7.

Similar reference numerals in the several figures indicate similar parts.

Wild fowl in flight, whether flying as single birds or as a flock, when seeking a feeding ground, are attracted to such areas where other birds are feeding. By instinct they are wary and hence more easily deceived by live birds anchored as decoys. I have discovered in my hunting practice that by using decoys so constructed that they may be manipulated from a blind, or shooting box, to simulate the feeding habits of the live birds, that equally good results may be accomplished. To this end, therefore, I make my decoy of two parts, an artificial buoyant bird body 1 and a head and neck portion 2 thereof which is pivoted to the body so that it may be manipulated in a forward position to crane the neck and submerge the beak. To restore these parts to their normal position, such as a bird assumes in swimming, I provide a counterweight in the form of an arm 3 so that the head and neck 2 may be caused to rock on the body. The pivot 4 is positioned on the body 1 at about the water line thereof and the design of the body is such that when further movement is imparted to the head the body will easily up-end and simulate the position of a bird diving for food. This body action is aided by using the end of the counterweight arm 3 as a lever acting against the underside of the rear end of the body when the head 2 has been depressed sufficiently to submerge the beak. The assembly of these parts is facilitated by providing the body with a central slot 1ª and fitting the part 2 for free movement therein.

The above-described actions of the decoy are accomplished by an association of parts which includes the underwater anchorage. At the selected feeding ground adjacent the shooting box, I sink a stake 5 into the muck in an upright position, the length of which is determined initially by the depth of the water, the intention being to have its upper end a few inches below the surface of the water. On the stake is fitted a sleeve 6 open at one side for easy application to and removal from the stake provided with a thumb screw 7 whereby its vertical position may be readily fixed with reference to the water level in the first instance and subsequently changed if the water level raises or lowers.

On the closed side of the bracket or sleeve I pivot a bell crank lever journaled on a stud 10 having an arm 11 which normally extends in an angular upward direction, and a depending arm 12. This lever is movably held in the position shown in Fig. 1 by a coil spring 13 in engagement with a fixed stop 14 on the sleeve. The extremity of the arm 11 is bifurcated and fitted therein is a removable pin 15 forming a journal for the eye formed on the lower extremity of a rod 16 which is allowed a rocking movement, free in the direction toward the plane of the pivot 10 but limited in its movement in the opposite direction by a shoulder 17 which is so arranged that when the decoy is floating normally the rod 16 extends substantially vertical to retain the decoy above the anchorage.

I effect a universal connection between the upper extremity of the rod 16 and the decoy which allows the decoy to swing according to the direction of the wind and current. This joint is located on the neck and head portion 2 in front of and above its pivot 4 and comprises a swivel connection, generally indicated by 18 in Figs. 1, 2 and 3. This connection comprises a box 19 forming a socket for a ball head 20 on the rod 16. The box 19 is constructed as shown in Fig. 8, to facilitate connecting and disconnecting the decoy with its anchorage. To this end I provide it at the top of one of its sides with an aperture 21 large enough to permit the passage of the ball 20. Leading therefrom across top of the box is a slot 22 the inner end of which extends forwardly and downwardly in the face of the box, as indicated at 23. At its lower end the slot continues rearwardly, as indicated at 24. To connect and disconnect the decoy the latter is turned upside down so that the rod 16 may traverse the convolutions of the slot and pass ball head 20 thereon through the aperture 21.

I manipulate the decoy by means of a string or cord 25 extending from the blind to its point of attachment to the bell crank arm 12. By pulling slightly on the cord against the tension of spring 13 the head of the decoy 2 may be caused to bob up and down and by increasing the pull on the cord the body 1 of the decoy may be rocked into the diving position and even drawn downwardly somewhat. In practice a number of these decoys will be grouped in a somewhat irregular pattern and as a separate cord extends from each to a common point it is possible to manipulate each in a different manner at different times. An experienced hunter can cause these movements of the decoy to be so realistically effected as to greatly increase his interest in the sport by adding to his game bag as a result of fowl thus attracted within gun range. I not only attribute much of the success attained with this decoy to the described movements, but I believe that because such movements create enough disturbance to the water by the creation of surface ripples an added attraction is effected for birds passing in flight.

I claim:

1. In a decoy, the combination with an artificial buoyant body of a water fowl having a head portion pivoted thereon in such a position that it may be tilted to submerge the beak, said pivot being so located with reference to the point of balance of the body on the water that movement of the head beyond that of submergence of the beak will up-end the body, of an anchorage, operating connections between the anchorage and the decoy for floating the decoy normally and manipulating said head and body, and a cord extending from said connections.

2. In a decoy, the combination with a buoyant body of an artificial water fowl having a movable head portion thereon depressible below the water line of the body and a pivot therefor located with reference to the water line and point of balance of said body on the water to cause the body to up-end upon downward movement of said head beyond that of partial submergence, of an underwater anchorage, connections between said anchorage and the decoy head for allowing the decoy to normally float on the surface of the water and effecting movement of the head thereon and the up-ending of the body, and means for manipulating said connections from a distant point.

3. In a decoy, the combination with a buoyant artificial body of a water fowl provided with a slot in its forward end, there being a head and neck portion pivoted in the slot, and a counterweight serving to normally maintain said head and neck portion in an upright position and to contact the body to move it into an upended position, of an underwater anchorage comprising a pivoted lever connected to the head and neck portion, a spring for holding the lever in a position to maintain the decoy in swimming position, and means for actuating the lever to cause the decoy to simulate the feeding position of a water fowl.

4. In a decoy, the combination with a buoyant artificial body of a water fowl having a head and neck portion movable to simulate feeding positions of such fowl, of an underwater anchorage comprising an upright portion, a removable sleeve thereon, a lever pivoted on the sleeve, a rod sustained in a vertical position on the lever having a swivel connection with the decoy, and means for operating the lever from a distant point.

5. In a decoy, the combination with a buoyant artificial body of a water fowl having a head and neck portion movable to simulate feeding positions of such fowl, of an underwater anchorage comprising an upright portion, a removable sleeve adjustable vertically thereon, a lever pivoted on the sleeve, a spring operating the lever in one direction, a rod pivoted on the lever and extending vertically therefrom, a universal jointed connection between the upper end of the rod and the decoy, and means for manipulating the lever from a distant point to effect movement of the decoy.

6. In a decoy, the combination with a buoyant artificial body of a water fowl having a head and neck portion movable to simulate feeding positions of such fowl, of an anchorage comprising a stake to be secured beneath the water level, a sleeve adjustable vertically thereon with reference to the water level, a lever on the sleeve, means yieldably maintaining the lever in its uppermost position and a connection between the lever and decoy for maintaining the latter in a trailing position and imparting movement thereto, and means for depressing the lever.

7. In a decoy, the combination with a buoyant artificial body of a water fowl having a head and neck portion movable to simulate feeding positions of such fowl, of an anchorage comprising an upright portion located beneath the water level, a sleeve adjustable thereon with reference to the water level, an arm pivoted thereon, a rod extending vertically from and pivoted to the end of the arm and connected to the decoy in the vicinity of the water level, a stop on the arm limiting movement of the rod in one direction thereon, means for yieldingly holding the arm in an upward position, and means for depressing it to impart movement to the decoy.

8. In a decoy, the combination with a buoyant artificial body of a water fowl having a head and neck portion movable to simulate feeding positions of such fowl, of an under water anchorage having a movable part operable from a distant point, and a swivel connection between it and the decoy comprising a ball joint which is detachable upon turning the decoy upside down.

9. In a decoy, the combination with a buoyant artificial body of a water fowl having a head and neck portion movable to simulate feeding positions of such fowl, of an under water anchorage having a movable part operable from a distant point and a swivel connection between it and the decoy comprising a rod having an enlarged head extending upwardly from said anchorage, and a box attached to the movable portion of the decoy for receiving the head, said box having an aperture in one of its walls for the passage of the head and having a slot leading therefrom in other walls for threading the rod therein to position the decoy in upright position with reference to said anchorage.

ALFRED M. SIGNALNESS.

REFERENCES CITED

The following references are of record in the file of this patent:

UNITED STATES PATENTS

| Number | Name | Date |
|---|---|---|
| 1,468,979 | Sherman et al. | Sept. 25, 1923 |
| 217,483 | Redmond | July 15, 1879 |